UNITED STATES PATENT OFFICE.

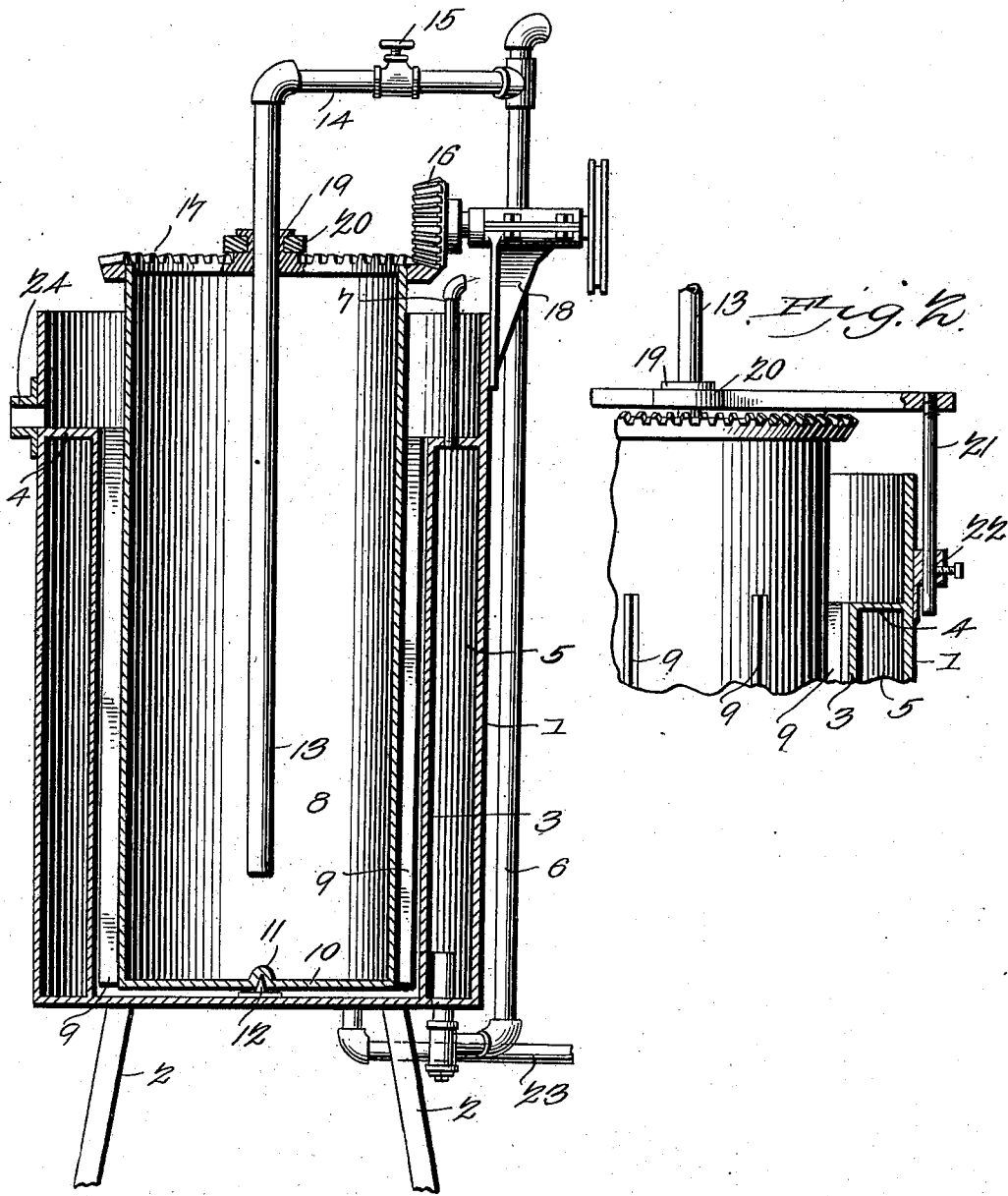

FRANK D. TALCOTT, OF MAYNARD, IOWA.

MILK-HEATER.

SPECIFICATION forming part of Letters Patent No. 712,345, dated October 28, 1902.

Application filed February 14, 1902. Serial No. 94,111. (No model.)

*To all whom it may concern:*

Be it known that I, FRANK D. TALCOTT, a citizen of the United States, residing at Maynard, in the county of Fayette and State of Iowa, have invented a new and useful Milk-Heater, of which the following is a specification.

This invention relates to milk-heaters.

The object of the invention is to provide a heater in which heat will be equally applied to both sides of a hollow column of milk and the same be thoroughly agitated while being heated, whereby the mass as a whole when it leaves the device will be evenly heated throughout.

With these and other objects in view, as will appear as the nature of the invention is better understood, the same consists in the novel construction and combination of parts of a milk-heater, as will be hereinafter fully described and claimed.

In the accompanying drawings, forming a part of this specification, and in which like numerals of reference indicate corresponding parts, there is illustrated a form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in longitudinal vertical section of a heater characterizing this invention. Fig. 2 is a sectional detail view of the upper portion of the heater and taken from the opposite side of the machine to that shown in Fig. 1.

Referring to the drawings, 1 designates a stationary cylinder having its bottom closed and its top open and supported upon legs 2. Within the cylinder is arranged a drum 3, provided at its top with a flange 4, secured to the cylinder 1 and forming in conjunction therewith a chamber 5, adapted to contain a body of water which is kept highly heated by steam introduced into its bottom through a steam-pipe 6, the top of the chamber being provided with a steam-escape pipe 7. The chamber 5 constitutes, in effect, a water-jacket and operates to heat the outer side of a hollow column of milk contained between the drum and a second cylinder 8, suitably spaced from the drum and above the bottom of the cylinder and provided on its periphery with a plurality of stirrers or agitators 9 in the nature of ribs. The cylinder 8 is provided with a bottom 10, having a centrally-disposed seat 11, adapted to engage a boss 12, carried by the bottom of the cylinder 1, by which arrangement the cylinder 8 is kept properly elevated above the bottom of the cylinder 1 and is also supported for rotary movement. The cylinder 8 also contains water, which is kept highly heated by steam introduced near its bottom through a steam-pipe 13, constituting a branch of the pipe 6, the two pipes being connected by a section of pipe 14, carrying a valve 15.

Motion is imparted to the cylinder 8 from a pinion 16, which meshes with a gear 17, carried by the upper portion of the cylinder, the shaft of the gear being supported in a bracket 18, attached to the outer side of the cylinder 1. The gear 17 is provided with a centrally-disposed bearing 19, through which passes the pipe 13, which latter operates to hold the cylinder 8 centered with relation to the water-jacket, and to brace the pipe and cylinder a brace-bar 20 is provided, in which the bearing 19 is seated, the terminals of the bar being rigidly connected to rods 21, attached to brackets 22, carried by the upper portion of the cylinder 1, as shown in Fig. 2.

The milk is fed to the cylinder 1 beneath the bottom of the cylinder 8 through a pipe 23 and passes upward into the space between the water-jacket and the cylinder 8. As the water in the jacket and the cylinder is kept highly heated and as the milk is thoroughly agitated by the stirrers 9, it will by the time it reaches the escape-opening 24 be thoroughly and evenly heated throughout, and thus be in the best possible condition for use. Owing to the violent agitation to which the milk is subjected, the formation of currents of cool milk will be positively obviated, so that the mass will be tempered in a thoroughly effective manner.

Having thus fully described my invention, what I claim as new, and desire to secure by Letters Patent, is—

1. A milk-heater comprising a stationary cylinder having a water-jacket and steam supply and escape pipes communicating therewith, a revoluble exteriorly-bladed water-holding cylinder arranged within the first-named cylinder, a gear carried by the upper end of the water-holding cylinder, a bearing supported by the stationary cylinder, and a shaft journaled in the bearing and carrying a pinion meshing with the gear.

2. A milk-heater comprising a stationary cylinder having a water-jacket and steam supply and escape pipes communicating therewith, a revoluble exteriorly-bladed water-holding cylinder arranged within the stationary cylinder, a gear secured to the upper end of the revoluble cylinder, and having a driving-pinion meshing therewith, and a steam-supply pipe having one member projecting through the hub of the gear and into the revoluble cylinder, and the other member into the water-jacket.

In testimony that I claim the foregoing as my own I have hereto affixed my signature in the presence of two witnesses.

FRANK D. TALCOTT.

Witnesses:
W. B. BEATTIE,
J. H. STRUTHOFF.